United States Patent Office 3,519,928
Patented July 7, 1970

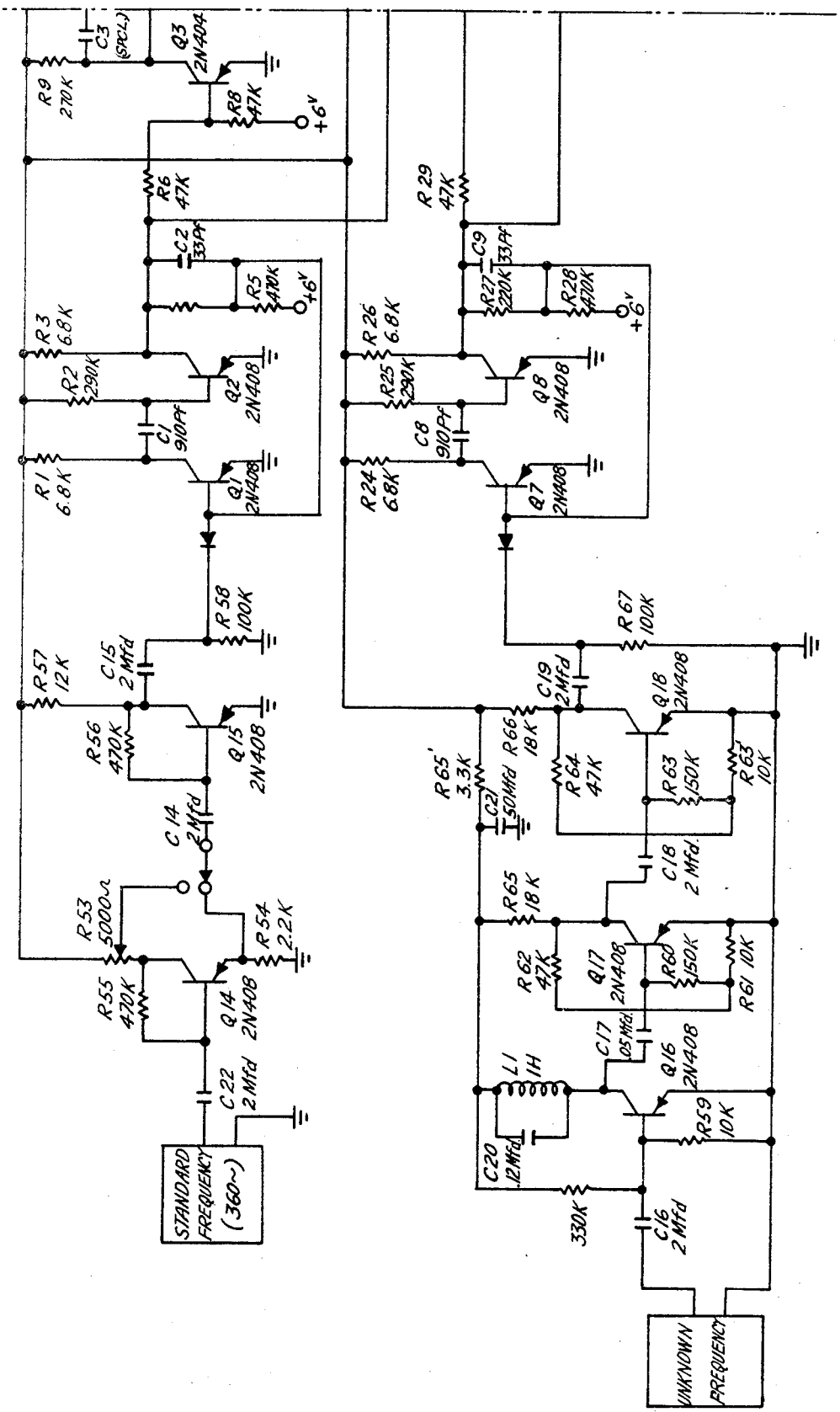

3,519,928
FREQUENCY COMPARISON APPARATUS AND METHOD WITH ERROR ELIMINATION
Murray Braverman, New York, N.Y., assignor to Bulova Watch Company, Inc., New York, N.Y., a corporation of New York
Filed Feb. 1, 1967, Ser. No. 613,156
Int. Cl. G01r 23/14
U.S. Cl. 324—79         6 Claims

ABSTRACT OF THE DISCLOSURE

A frequency meter, for comparing a signal of unknown frequency with a standard frequency source, which utilizes the differentiated output of an electrical sawtooth or ramp function, representing a multiplication of the two signals, to provide a polarized D.C. signal level which, by application to a nulling meter, determines the amount and direction of frequency deviation.

BACKGROUND OF THE INVENTION

The present invention relates to frequency measurements and, more particularly, is directed to frequency-measuring instrumentation which utilizes the change in slope of an electrical ramp function, representing the composite of standard and test frequency signals, to provide a direct-current output signal, readable on a meter, for determining the amount and direction of difference between two frequency signals under comparison. While by no means limited thereto, the invention finds particular utility in the calibration and adjustment of timepieces and timing mechanisms such as used, for example, in the fusing of explosive warheads in missiles and other armed projectiles.

Several different types of electrical instrumentation methods for the measurement of frequency and frequency differences are known to the prior art. One known type of frequency meter of relatively coarse resolution and accuracy is the integration type, such as used for example in an automobile tachometer, wherein a signal source is converted into a train of electrical pulses of predetermined height and width which are the integrated, by means of a direct current D'Arsonval movement, to provide a direct frequency reading. As another example, it is well known to measure or set a desired frequency fairly accurately by using Lissajous patterns generated on a cathode ray oscilloscope to achieve frequency synchronism between two signal waves. It is also conventional to achieve reasonably accurate frequency comparison and measurement through the use of ratio detectors, discriminators, and similar frequency-sensitive circuits whose output is responsive to the difference or beat between two frequency sources. One of the most precise instrument heretofore known to the art for accurate frequency metering is the digital or pulse type wherein the frequency source under investigation is converted into a pulse frequency signal for comparison with a standard frequency source typically provided by a molecular resonator or stabilized crystal oscillator. In this last type of meter, which provides highly accurate measurement but is exceedingly costly to manufacture, frequency measurement is effected by counting the number of pulses produced by the test signal wave during a precisely determined gating time provided by the standard oscillator which operates as a timing clock.

SUMMARY OF THE INVENTION

The novel type of frequency meter proposed herein is a low cost instrument which achieves the high resolution and accuracy heretofore found only in expensive frequency meters of the digital type, while obtaining the added advantages of high discrimination sensitivity and immunity to noise. In the present invention, the signal wave of unknown frequency is compared against a standard source of known frequency (such as for example a stabilized crystal oscillator) by means of a unique circuit generating a ramp signal output which is a composite function of both the standard and the unknown frequency signals. In turn, this signal, after differentiation, is transformed into a D.C. voltage level whose amplitude is representative of the deviation or beat existing between the two frequencies. By adjustment of the frequency output of either the unknown or the standard frequency source, the resulting D.C. voltage level, as measured by a nulling meter, can be made to approach zero, thus indicating that parity has been achieved between the two signal sources within a high degree of accuracy limited only by the sensitivity of the nulling meter and the inherent thermal noise of the circuit components. The adjustment of either the standard or unknown frequency source to achieve parity is facilitated because the resultant D.C. output generated by the circuit, which represents the beat between the two signals, possesses a polarity which is indicative of the direction of the difference between the two signals, that is, whether the unknown or the standard is the higher frequency signal. Furthermore, as the amplitude of this D.C. output signal is directly proportional to the amount of deviation existing between the unknown and standard frequency signals, the output may be coupled, if desired, in a servo feedback arrangement with either one of the frequency sources to effect an automatic setting or measurement of frequency. Also, by reason of the highly linear and proportional nature of the output signal produced by the present circuit, the circuit may be readily adapted for use as a highly precise frequency-modulation detector whose output is representative of the instantaneous frequency deviation between the received signal and the center frequency produced by an internal oscillator.

In a first embodiment of the invention (referred to as the "signal comparator" circuit) the system which performs frequency measurement and comparison according the principles of the present invention is of particularly simplified construction, where as in a second embodiment (referred to as the "double comparator" circuit) a more sophisticated design is employed for eliminating certain time delays, occasioned in adjustment of the two frequency sources to the parity condition in the single comparator embodiment, due to a discontinuity which occurs during the retrace period of the ramp function generated by the circuit, as hereinafter explained.

It is therefore a principal objective of the present invention to provide a novel and improved method and instrumentation for measuring frequency to an extremely accurate and precise degree with the capability of distinguishing frequency differences on the order of one part in a million or greater, as well as providing usable direct-current output readings over a wide range of frequency deviations.

It is another objective of the present invention to provide frequency measuring instrumentation for calibrating to a high degree of precision the accuracy of timepieces, timing fuse mechanisms and other timing devices.

It is a further objective of the present invention to provide frequency measuring instrumentation for generating a polarized direct-current output signal which is directly proportional, to a high degree of linearity, to the amount and direction of difference between two frequency signals under comparison.

It is a still further objective of the present invention to provide a new and improved type of frequency-modulation detection circuit for extracting the information contained in an F–M signal.

It is a principal feature of the present invention to provide a new and improved type of frequency measurement instrumentation with high discrimination sensitivity and other important advantages whose accuracy and precision is comparable to that attained by conventional digital frequency meters of the pulse counting type, but which is of simpler design and more economical to manufacture.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENTS

Figure 1:
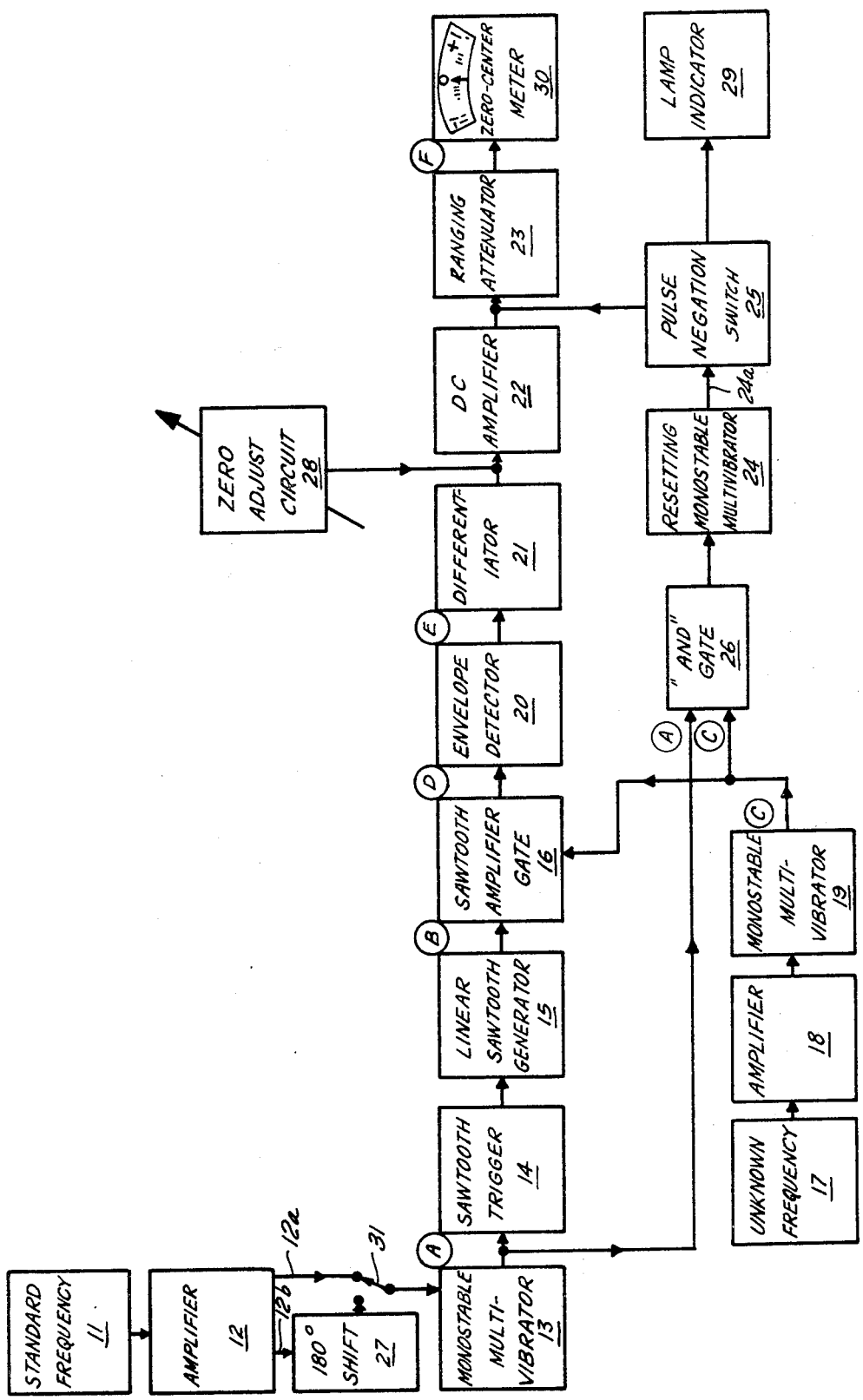
FIG. 1 is a block diagram of the "single comparator" circuit embodiment of a frequency measuring system according to the principles of the present invention.
Figure 2:
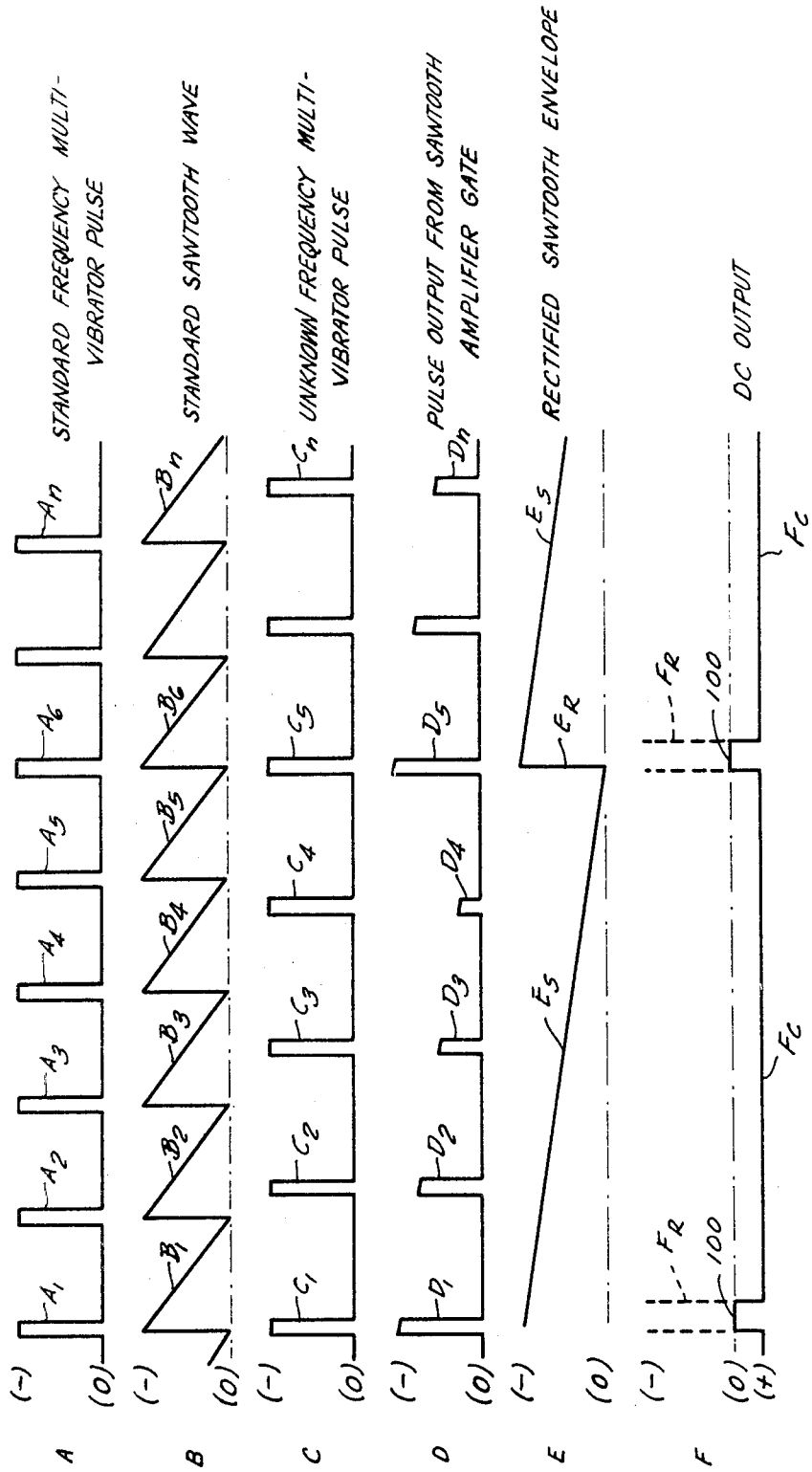
FIG. 2 is a series of six waveform curves, A–F, arranged on a arallel time scale and representing signal waveforms at various points in the circuit, which will be useful in understanding the operation of the single comparator circuit embodiment of FIG. 1.

Referring now to FIGS. 1 and 2 which set forth, respectively, a block diagram of a frequency measuring system according to the present invention and a diagram of the waveform signals appearing at various points in the circuit, it will be seen that the system inputs comprise two frequency sources: a standard frequency source 11 and a source of unknown frequency signal 17, either one of which may be adjustable in frequency depending upon whether the unknown frequency source 17 is to be adjusted to match a fixed frequency of the standard 11, or, on the other hand, a calibrated, variable frequency source is used for the standard frequency source 11 and is to be adjusted to match that of the unknown frequency source 17 in order to determine the frequency of the latter.

Consider, by way of example for the following discussion, that the former situation is the case and the standard frequency source 11 is fixed and generates electrical oscillations of precisely-known frequency value to which the unknown frequency source 17 is to be compared. A typical application of such an arrangement would be in the calibration of a timekeeping mechanism, such as the balance wheel assembly of a conventional watch or the tuning fork oscillator of an electronic timepiece. Thus, the unknown frequency source 17 might, in this example, be derived from an acoustic microphone placed in contact with the timepiece so that its "ticks" or vibrations are converted into electrical signals.

The electrical output of the standard frequency source 11, which might typically be a stabilized crystal oscillator, or other oscillator of fixed and known frequency, is supplied to an amplifier 12 and then over lead 12a through switch arm 31 to a monostable multivibrator 13 (disregarding for the moment the 180° phase shift element 27 which will be referred to later in the discussion). As shown in waveform A of FIG. 2, the monostable multivibrator 13 generates a train of output pulses $A_1 \ldots A_n$ of fixed amplitude and width, one pulse being produced for each cycle of oscillation of the standard frequency source 11.

The multivibrator output pulses are fed to the input of a linear sawtooth generator stage, comprised of elements 14 and 15, which, as shown in curve B of FIG. 2, produces a sawtooth wave train $B_1 \ldots B_n$, with a sawtooth cycle being initiated on each multivibrator pulse. The sawtooth output B is next supplied to an amplifier gate 16 which is gated by a pulse signal initially derived from the unknown frequency source 17. As shown in the circuit diagram, the electrical signals from the unknown frequency source 17 are first amplified at 18 and then fed to a monostable multivibrator 19 (which may be of similar design to that of multivibrator 13) to produce an output pulse train shown as waveform C, containing respective pulses $C_1 \ldots C_n$ of fixed amplitude and width for each cycle of oscillation of the unknown frequency source.

From the waveform diagrams of FIG. 2, which are drawn on a parallel time scale, it will be seen that, under the circumstances shown, the multivibrator pulses $A_1 \ldots A_n$ derived from the standard frequency source 11 are spaced together more closely in time than the multivibrator pulses $C_1 \ldots C_n$ originating from the unknown frequency source 17, thus representing the condition wherein the unknown signal is of somewhat lower frequency than that of the standard. In fact, for the conditions illustrated, wherein every fifth pulse $A_1$, $A_6$, etc. of the standard coincides in time with every fourth pulse $C_1$, $C_5$, etc. of the unknown frequency signal, the ratio of frequencies is 5:4, and the unknown frequency is 20% less than the frequency of the standard source.

The gating pulses $C_1 \ldots C_n$ derived from the unknown frequency source 17 and supplied to the sawtooth amplifier-gate 16 produce an output, shown as waveform D in FIG. 2, which is a composite function (actually a multiplication) of the standard sawtooth wave B and the pulse train C derived from the unknown frequency source. As is shown in curve D, the output is in the form of a series of pulses $D_1 \ldots D_n$ having the frequency of the unknown source 17 and a height or amplitude which varies from pulse to pulse depending upon the point in each cycle of the sawtooth wave B that the gating signal C arrives from the unknown frequency source 17. Thus, in the event that both signal source 11 and 17 were of the same frequency, the sawtooth wave B supplied to element 16 would be gated by a pulse in the pulse train C occurring at the same point on each cycle of the sawtooth, and thus the train of pulses $D_1 \ldots D_n$ representing the output of the gate element 16 would all be of the same height. However, in the example considered, wherein the unknown frequency signal 17 is of lower frequency than that of the standard source 11, the height of the pulses in the pulse train D varies in a periodic manner, with a locus height which describes a new sawtooth wave. This new sawtooth wave, representing the amplitude envelope of the pulse train produced at the output D of element 16, is obtained by rectification of the signal by envelope detector 20 which, through the use of suitable lowpass filters, removes the high frequency pulses and produces the low-frequency sawtooth envelope waveform shown at E. The waveform E has a slope $E_S$ as well as a repetitive cycle period which corresponds directly to the frequency deviation or beat existing between the two signal sources 11 and 17.

The rectified sawtooth wave E, provided at the output of the envelope detector 20, is next supplied to a differentiator circuit 21 which differentiates the wave to produce an error signal in the form of a D.C. voltage level representing the slope $E_S$ of the sawtooth function E. This differentiated error signal is a constant except during the sawtooth retrace portion indicated as $E_R$. The differentiated slope signal, after amplification by a high input impedance amplifier 22 and attenuation, if necessary, by resistor ranging circuitry 23, appears as a D.C. output represented by the curve F. This output F in turn may be applied directly to a D.C. zero-center nulling meter 30 or to other signal indicating means.

Since the sawtooth function E, representing the frequency deviation between the two input signals 11 and 17, is periodic in nature, the retrace portion $E_R$, which occurs when the wave reaches the end of a sawtooth and commences a new cycle, would, upon differentiation, produce an offsetting voltage pulse $F_R$ of large amplitude causing the integrated or average value of the D.C. output F of the comparator circuit to be zero, if means were not taken to blank out this portion of the sawtooth wave. In other words, the slope of the retrace portion $E_R$ of the sawtooth function E, when differentiated, will produce a voltage pulse $F_R$ of short duration but of such large amplitude that its average value over the period of the sawtooth cycle would be equal to the constant D.C. voltage level $F_C$ representing the slope of the portion $E_S$ of the sawtooth. Therefore, in order to produce a meaningful output for application to the meter 30, the retrace portion $E_R$ of the sawtooth wave cycle is blanked out by negation circuit means which will be described, so that the D.C. output level of waveform F drops to zero, as indicated at 100, during this period of time, thus producing a slight discontinuity in the uniformity of waveform F, but not materially affecting the average value of the D.C. output signal read by the meter 30.

Blanking of the D.C. output signal F during the sawtooth retrace portion $E_R$ is accomplished by utilization of the negation circuit stage shown in the lower right-hand portion of FIG. 1 which comprises an "And" gate 26 connected to receive input pulses from both the standard frequency multivibrator 13, and from the unknown frequency multivibrator 19. When the random phase of the two frequency signals is such that the pulses produced are coincident, that is, a pulse in waveform C overlaps a pulse of waveform A (as is shown to occur in the waveform diagrams of FIG. 2 on pulse $C_5$ of the unknown frequency pulse train C and pulse $A_6$ of the standard frequency pulse train A), an output pulse is produced by the "And" gate 26 which triggers a resetting monostable multivibrator 24 to produce a "negation" pulse on output line 24a. This negation pulse operates the pulse negation switching element 25 to temporarily disconnect the output of the D.C. amplifier 22 from the output circuit 23 feeding the meter 30, thus preventing the high amplitude transient pulse $F_R$ which occurs during the retrace period of the sawtooth E from reaching and causing a spurious response in the meter 30. Accordingly, by means of the pulse negation circuitry just described, the comparator produces a unidirectional and essentially constant D.C. output voltage level $F_C$ for application to the zero-center meter 30, and the opposite-polarity transient pulse $F_R$, produced by the differentiation of the retrace portion $E_R$ of the sawtooth, is prevented from influencing the meter reading.

When an instantaneous phase coincidence between the unknown and standard frequency sources occurs (such as with pulses $C_5$ and $A_6$ in the diagram of FIG. 2), a lamp 29, also connected to an output of the pulse negation switch 25, is illuminated to indicate that the D.C. output F of the comparator circuit is being temporarily disconnected from the meter 30 and that blanking or negation of the output signal is occurring. In operation of the comparator, when the frequency difference between the two signal sources 17 and 11 is great, the condition of pulse coincidence as sensed by the "And" gate 26 will occur at a correspondingly high rate, causing the indicator lamp 29 to flash rapidly. On the other hand, as the two frequency sources are adjusted to approach parity, coincidence occurs less frequently, although when it does the indicator lamp 29 will remain lit for a longer period of time since the respective pulse trains A and C will then move more slowly out of phase coincidence. (In the latter situation pulse coincidence, with its concomitant activation of the pulse negation circuitry, occurs on many consecutive pulses as the relative phase between the two pulse trains A and C changes only a slight amount on each cycle.)

From the foregoing description of the comparator system, it will be understood that the D.C. output level F supplied to the nulling meter 30 has a D.C. or average value which is directly proportional to the magnitude of the frequency deviation existing between the standard frequency 11 and the unknown frequency source 17. Furthermore, the polarity of the output of the comparator circuit which is supplied to the meter 30 will be indicative of the direction of the deviation. In the illustrative situation shown in FIG. 2, wherein the standard is of higher frequency than the unknown signal, the slope of the resulting sawtooth waveform E is downwardly directed, heading toward a more positive condition; on the other hand, had the frequency of the unknown source 17 been higher than that of the standard, the slope of the waveform E would have been upward or negative-going, thus producing a D.C. output level F of opposite polarity.

When the frequency deviation between the two signal sources 11 and 17 is very great, observation of the frequency of flashes of the lamp 29 may be used as a visual indicator means for obtaining a coarse frequency matching, rather than the needle of the meter 30 which, for substantial frequency differences, would be offscale due to the large D.C. output level F generated by the comparator circuit. However, as the frequencies of the two signal sources approach parity, and the frequency deviation becomes small, the nulling meter 30 is then used to determine a precise match. As stated previously, the operation of the comparator circuit is such that the amplitude and polarity of the D.C. output F is directly proportional to the magnitude and direction of the frequency deviation; consequently, in order to minimize the frequency difference, adjustment is made of the variable frequency element, in this case the unknown frequency source 17, to make this output level approach zero as nearly as possible. (A zero adjust circuit element 28 is provided for balancing the operational parameters of the output circuitry of the comparator on the "no signal" condition, which from an electrical standpoint occurs at the same point as the frequency parity condition, so that inaccuracies in measurement due to amplifier drift are substantially eliminated.) Accordingly, through the use of a zero-center nulling meter of high sensitivity, or even a ballistic galvanometer for ultra-precise comparison measurement, extremely small frequency differences can be detected with the comparator system of the present invention, the limit being only a function of the inherent thermal noise of the comparator system components.

As adjustment is made to the frequency of the unknown frequency source 17 to approach parity with the standard source 11 and the frequency difference between the two signal sources becomes smaller, under certain conditions, due to the relative phase relationship between the two signal sources, pulse coincidence between the unknown frequency pulse train C and the standard frequency source A may occur as the two frequency sources are very near the matched condition. In other words, the instantaneous phase difference between the two now nearly-equal frequency signals may be zero and, due to the small beat or difference frequency between the two signals, the signal sources will only slowly move away from the zero phase relationship or coincidence condition. Under these circumstances, with pulse coincidence lasting for many consecutive cycles of the respective pulse trains A and C, the pulse negation circuitry, shown in the lower right-hand portion of FIG. 1, will operate to disconnect the output of the amplifier 22 from the meter 30 for a considerable period of time, thereby preventing any finer frequency balance adjustment being made in response to the meter indication until the respective pulse trains A and C have moved out of phase coincidence and the pulse negation circuitry is de-activated.

In situations where pulse coincidence occurs when the frequencies of the two signal sources are quite closely matched, within a small fraction of each other, the waiting period for the pulse trains A and C to move out of the phase coincidence condition may be quite long. In order to avoid the necessity of waiting for the closely-matched frequency signals to move out of phase, a 180° phase shifting network is introduced at one of the signal inputs to the comparator circuit to shift the phase relationship between the pulse trains A and C out of coincidence, so that further adjustment to attain closer frequency matching by observation of the meter indication 30 can proceed immediately without delay.

As shown in the circuit diagram of FIG. 1, a 180° phase-shifting network 27 is connected to an auxiliary output line 12b of the standard frequency amplifier 12. With the switch arm 31 in the position shown in the diagram, the output of amplifier 12 is supplied over line 12a to the monostable multivibrator 13 in the nominal mode of operation of the comparator circuit. However, if pulse coincidence should occur when the two signal sources 11 and 17 are being brought to a closely matched condition, thus causing the pulse negation switch 25 to be activated and lamp 29 to remain lighted for considerable period of time, the switch arm 31 is thrown to the other position so as to connect the 180° shift network 27 into the circuit. This operation immediately moves the two pulse trains A and C out of phase by substantially 180° so that pulse coincidence no longer occurs, and, more importantly, because of the fact that the two frequencies are very closely matched, the relative phase relationship between the two signals will change only very slowly. Hence the phase shift defers the re-occurrence of the pulse coincidence condition for a substantial period of time which is usually sufficient to complete the adjustment of the frequency sources to a parity match within the degree of accuracy desired.

In operation of the comparator, if the lamp 29 should turn on when the two frequencies are quite closely matched (on the order of only one beat per ten seconds or better), then the operator switches in the 180° shifting network 27 through the switch arm 31, thus eliminating the pulse coincidence condition and immediately enabling further frequency adjustment to be made through observation of the reading of the nulling meter 30. Should phase coincidence re-occur before final frequency adjustment to the limits of the system is made, it is merely necessary for the operator to return the switch arm 31 to its original position, thus effectively shifting the standard frequency another half a cycle in phase with respect to the unknown frequency source 17, so as to again restore the respective pulse trains A and C to the non-coincidence condition.

Of course the intervention of the operator to manually actuate the switch arm 31 for introducing the phase shift network 27 into the comparator circuit may be obviated, if desired, by the provision of an automatic switching element of conventional design at 31 which is triggered by a signal supplied from an auxiliary output of the resetting monostable multivibrator 24. However, in such case, additional circuit means must be provided, in the form of a suitable time delay element, to inhibit the operation of the phase shifting switch 31 when the pulse trains A and C are not relatively closely matched in frequency since, during the coarse adjustment toward frequency parity, pulse coincidence, and the concomitant actuation of the pulse negation circuitry, occurs many times per second and does not present any problem in the operation of the comparator. It is only when the signal sources 11 and 17 are quite close together in frequency, so that the period of the beat or difference frequency is considerable, that it is desirable that means be provided for eliminating the long time wait for the pulse trains to move out of coincidence so that the pulse negation circuitry is deactivated and further meter readings can be taken.

Figure 3:
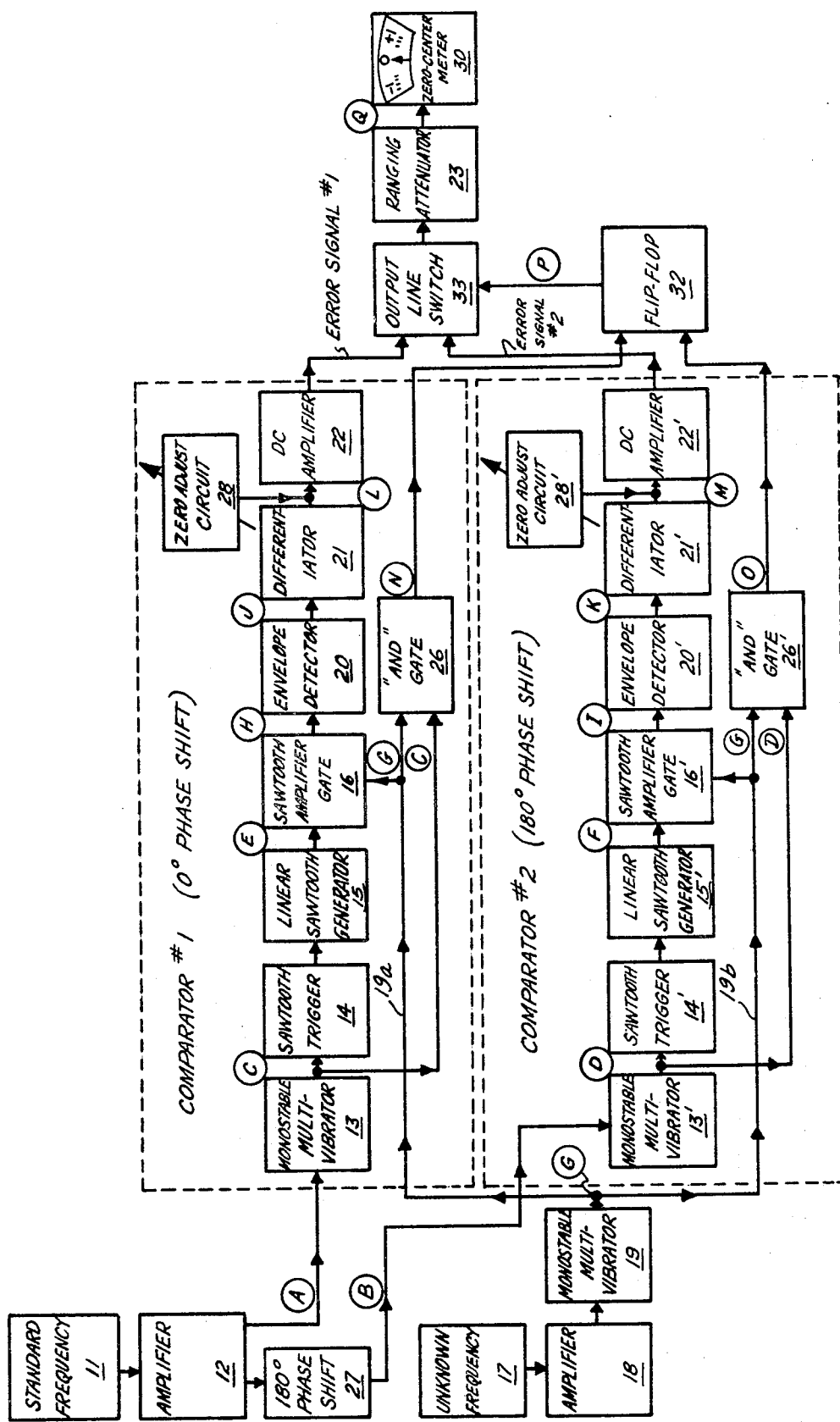
FIG. 3 is a block diagram of the "double comparator" circuit embodiment of a frequency measuring system according to the principles of the present invention.

In order to avoid the discontinuities and transient responses produced by the need for blanking from the comparator output the retrace period of the differential sawtooth error signal, a more sophisticated embodiment of the present invention is provided by the frequency measuring system shown in the block diagram of FIG. 3.

In brief, the double comparator configuration of FIG. 3 utilizes two comparator chains, each chain being comprised of substantially the same elements as used in the single comparator system of FIG. 1. (For convenience of reference, block diagram components in the double comparator system of FIG. 3 which are identical to those of the single comparator circuit of FIG. 1 have been designated with the same reference numerals, and the presence of a prime subscript to the reference numerals for certain comparator components is utilized to distinguished elements of comparator chain #2 from their respectively identical counterparts in comparator chain #1.)

A principal distinguishing characteristics of the double comparator arrangement is that a 180° phase shift is caused to exist between the two chains, and the output of each comparator chain is used alternately, with switching between the two chains occurring upon the phase coincidence of signals from the standard and known frequency sources. On the occurrence of phase coincidence, logic switching circuitry is provided to transfer the input to the meter indicator from the comparator chain in which coincidence is taking place to the other comparator chain where a 180° phase displacement exists between the standard and unknown frequencies. The output of the second comparator chain then provides the output signal for the system (and the input to the meter indicator) where phase coincidence occurs in that chain, whereupon the output is switched back to the first comparator chain where the two frequency signals are again 180° out of phase. In this manner, the output produced by the overall comparator system is a continuous, uninterrupted D.C. level (as contrasted with the discontinuous output level obtained with the single comparator system of FIG. 1) and has an amplitude and polarity representing, respectively, the amount and direction of frequency deviation between the two frequency sources. In addition to eliminating any need for temporarily blanking the output of the comparator circuit from the nulling meter, the double comparator embodiment of the present invention possess a further advantage over the single comparator design in that the switching between comparator chains on the occurrence of phase coincidence in one chain is effected at a time in the cycle of the other chain when the transients in the latter chain's differentiator stage, due to RC time constants, have died out and the response of the comparator is stabilized at a uniform output level. This improves the linearity of response of the comparator operation as a whole.

Figure 4A:
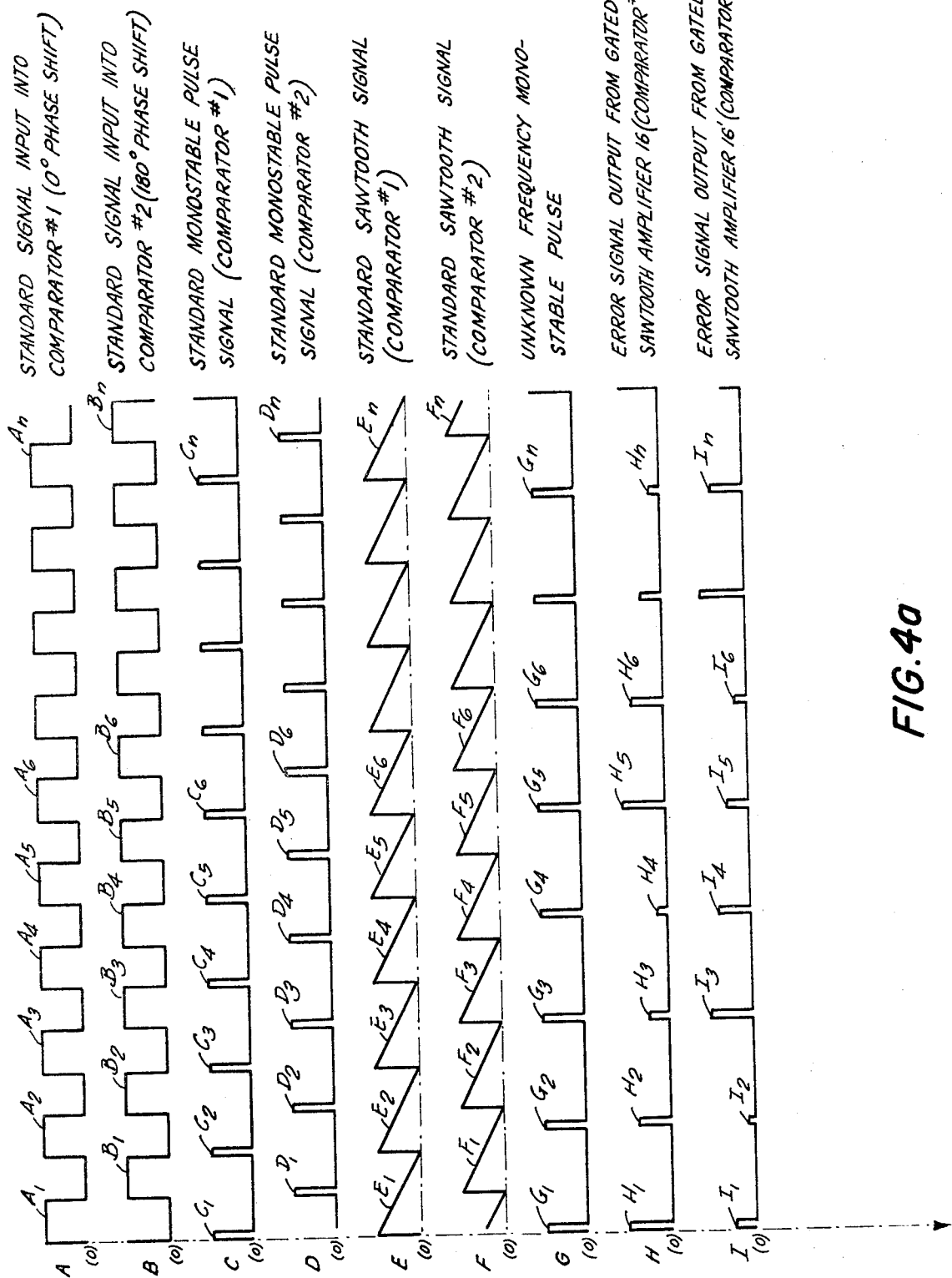
FIG. 4 (comprised of FIGS. 4a and 4b arranged in vertical alignment) is a series of seventeen waveforms, A–Q, arranged on a parallel time scale and representing signal waveforms at various points in the circuit, which will be useful in understanding the operation of the double comparator circuit embodiment of FIG. 3.
Figure 4B:
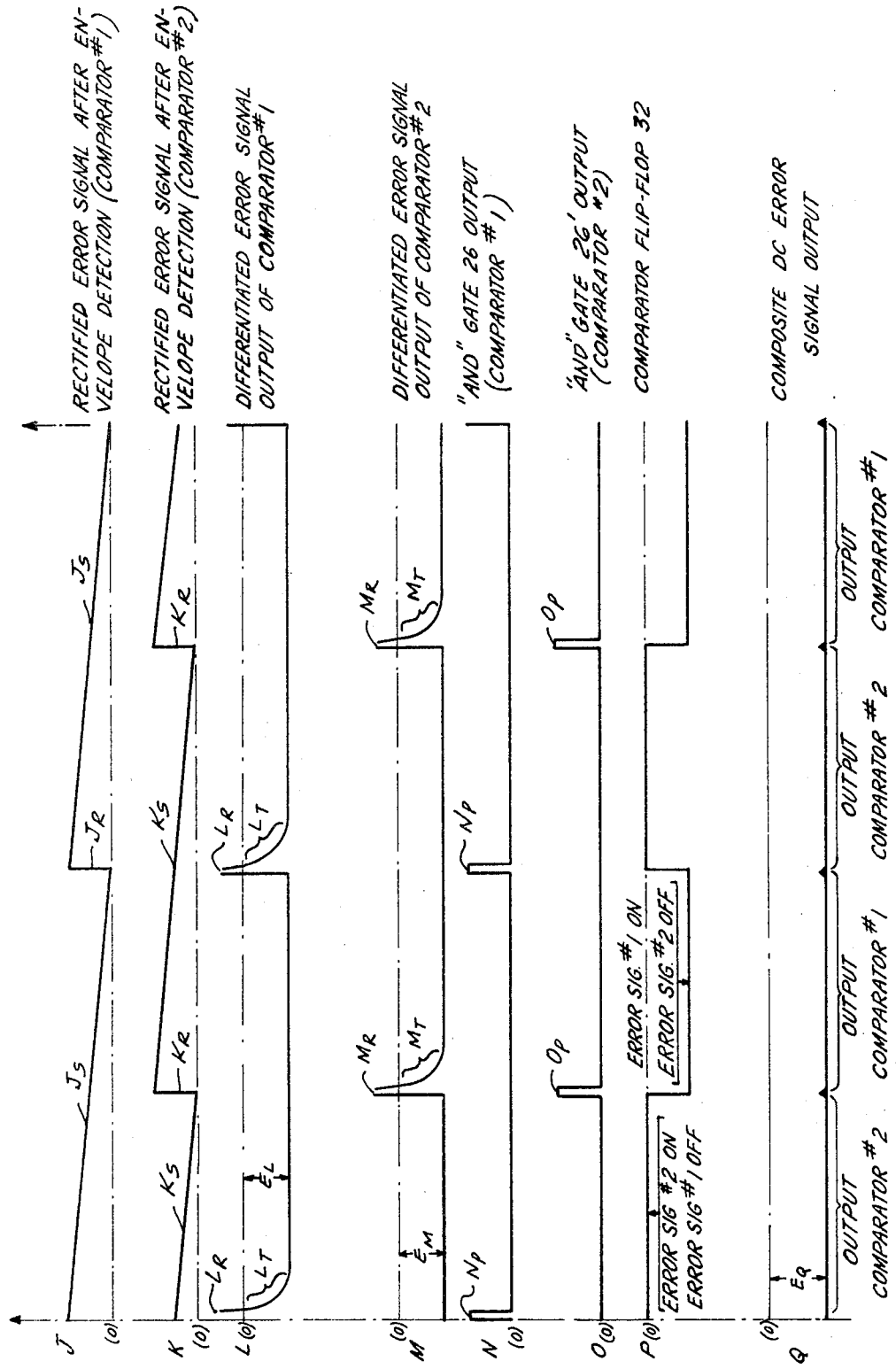

Referring now to FIGS. 3 and 4 (the latter being a diagram of the waveform signals, drawn on a parallel time scale, appearing at various points in the circuit), a description of the operation of the double comparator embodiment of the frequency measuring system of the present invention will now be set forth. In many respects the operation of the double comparator system is similar to that of the single comparator system previously described in detail; accordingly, in the interest of brevity, only a brief explanation will be given of the operation of the double comparator embodiment, with particular emphasis on its differences over the first embodiment.

In the operation of the double comparator system of FIG. 3, the signal from the standard frequency source 11, after amplification at 12, is provided as an input to each of the two comparator chains #1 and #2. The input to comparator #1 (shown as waveform A in FIG. 4) and the signal input to comparator #2 are identical, except that the latter is first passed through a 180° phase shift element or inverter 27 where it is shifted out of phase with signal A before being supplied as waveform B to comparator #2. (While waveforms A and B derived from the standard frequency source 11 are represented as being square waves, it will be understood that other conventional types of alternating waveforms, e.g., sinusoidal, sawtooth, etc., would be equally suitable as an input to the comparator chains of the system.)

The operation and function of the two comparator chains #1 and #2 are identical in all respects, except that the signal inputs and resulting outputs of the chains are 180° out of phase. Upon entering its respective comparator chains #1 or #2, the standard signal input A or B is supplied to a monostable multivibrator 13, 13' which generates a train of output pulses $C_1 \ldots C_n$, $D_1 \ldots D_n$ of fixed amplitude and width, a pulse being produced for each cycle of oscillation of the standard frequency source 11. These multivibrator pulses in turn trigger the linear sawtooth generator 15, 15' which provides an output in the form of sawtooth waves E, F of identical amplitude and of frequency corresponding to the standard source 11, while maintaining a 180° phase separation between the two sawtooth waveforms.

As shown in the circut block diagram of FIG. 3, the unknown frequency 17 is amplified at 18 and then fed into an associated monostable multivibrator 19 to produce an output pulse train (shown as waveform G in FIG. 4) containing pulses of fixed amplitude and width for each cycle of oscillation of the unknown frequency source. The output G of the standard frequency multivibrator 19 is supplied via respective leads 19a and 19b to each of the sawtooth amplifier gates 16, 16' in the associated comparator chains #1 and #2. (Note that the gating signal entering amplifier gate 16 of comparator #1 is the same signal and thus in phase with the gating signal entering amplifier gate 16' of comparator #2.)

The output of each sawtooth amplifier gate 16, 16' of the respective comparators #1 and #2 is a series of pulses $H_1 \ldots H_n, I_1 \ldots I_n$ having the frequency of the standard source 11 and a variable pulse height and periodicity dependent upon the frequency and phase relationship of the unknown source 17 to the standard source 11. The respective waveforms H and I are identical with each other in all respects save that they are 180° out of phase. (This relationship may be observed in the waveform diagrams of FIG. 4 by noting that a pulse $I_3$ of maximum height in pulse train I appears approximately midway between maximum height pulses $H_1$ and $H_5$ of waveform H.)

Next, the respective pulse waveforms H and I enter the envelope detector 20, 20' of its associated comparator chain where rectification produces the resulting sawtooth waveforms J and K, representing the locus of the pulse peaks of the respective variable-height pulse trains H and I. As explained previously, the slope of these sawtooth waveforms J and K constitutes an error indication of the amount and direction of frequency deviation between the two signal sources.

The rectified error signals J and K are then differentiated at 21, 21' to produce respective output waveforms L and M. For almost all of the period the output of the respective differentiators 21, 21' is a constant DC voltage level $E_L$, $E_N$ (the circuit parameters of the two comparator chains being adjusted so that $E_L = E_M$), except during the relatively brief retrace portions, indicated as $J_R$ and $K_R$, of the respective sawtooth waveforms J and K. During these retrace portions of the sawtooth waveforms, the respective differentiated output from 21, 21' is an opposite-polarity pulse $L_R$, $M_R$ of large amplitude. However, note that these differentiated retrace pulses occur at respectively different times in the waveforms L and M due to the 180° phase displacement between these two signal waves.

Because of RC time constant limitations on the design of the differentiator stages 21 and 21' of the respective comparator chains #1 and #2, there is a relatively short interval after the termination of each retrace pulse in which there is a transient $L_T$, $M_T$ due to the exponential rise of the respective waveforms L, M toward the constant DC output level $E_L$, $E_M$. In this transient region $L_T$, $M_T$ the respective output error signals L and M of the two comparator chains are not yet stabilized and thus do not accurately reflect the frequency deviation between the two sources 11 and 17. For this reason it is desirable that the transient portions of the respective output signals L, M of comparator chains #1 and #2 be suppressed from reaching the nulling meter 30, in addition to the blanking of the reverse-polarity pulse due to the retrace portion of the sawtooth wave function. Such suppression from the output of transients $L_T$ and $M_T$ is accomplished in the double comparator circuit embodiment by an automatic switching operation which will shortly be described.

After differentiation the respective error signal waves L and M are next amplified at 22, 22' and then fed alternately through an output line switch 33 which may be a reed relay for low frequency applications, or an electronic semiconductor switch for higher frequency operation. The comparator output passed by the switch 33 is next attenuated if necessary in the ranging attenuator 23 before being supplied to the zero-center meter 30.

The switching operation performed in element 33, between the respective error signal outputs L and M provided by the two comparator chains #1 and #2, is triggered by a flip-flop driver 32 whose operation in turn is controlled by logic signals derived from respective "And" gates 26, 26'. The "And" gates 26, 26' provide respective output pulses $N_P$ (waveform N) and $O_F$ (waveform O) when pulse coincidence between the standard and unknown frequency pulse trains occurs in their corresponding comparator chain. Thus, "And" gate 26 in comparator #1 produces a switching pulse $N_P$ when the multivibrator pulse train G derived from the unknown frequency source 17 coincides with the zero-degree phase shift pulse train C supplied by the standard frequency multivibrator 13. (In the waveform diagrams of FIG. 4, which are drawn on a parallel time scale, this pulse coincidence condition is shown to occur on pulses $C_1$, $C_6$, etc. of the standard frequency pulse train, thereby producing an output pulse $N_F$ from "And" gate 26 in comparator #1.) Correspondingly, "And" gate 26' in comparator chain #2 operates in a similar manner to provide a switching pulse to the flip-flop driver 32 when the unknown frequency pulse train G is in phase coincidence with the 180° phase-shifted pulse train D derived from the standard frequency multivibrator 13'. As a consequence, the occurrence of a pulse coincidence condition in either comparator #1 or comparator #2 serves to actuate the switching circuitry 32, 33 so as to transfer the input to meter 30, from the comparator chain in which pulse coincidence is then occurring, to the other chain in which the respective signals are at that time 180° out-of-phase (the operation of the comparator flip-flop and switching circuitry being shown as waveform P in FIG. 4).

The resultant signal supplied to the nulling meter 30, formed by switching back and forth between the two respective output error signals L and M of comparator chains #1 and #2, is thus a composite waveform Q having a constant D.C. value $E_Q$. As explained previously in conection with the description of the single comparator system, the composite comparator output signal $E_Q$ is indicative of both the magnitude and direction of the frequency difference existing between the standard and unknown signals. Thus, by adjustment of either one of the two signal sources 11 and 17 so as to reduce the amplitude of the error signal supplied to the nulling meter 30, the two frequency sources can thereby be made to approach match.

As will be observed from conjoint consideration of waveforms L, M and P in FIG. 4, one of the more important advantages of the double comparator, as compared with the single comparator embodiment, is that output switching between the two comparator chains #1 and #2 of the double comparator system is effected at a point in time when the differentiated error signal L or M of the switched-in chain has become stabilized at a fixed D.C. voltage level, that is, after the transient changes $L_T$ or $M_T$ produced by the RC time constant parameter of the differentiator circuit has died out. Thus it will be observed that, when transfer is made from the output of comparator #1 to the output of comparator #2 as represented in waveform P, the latter half of the cycle of waveform M is then employed as the useful output signal of the system; similarly, when transfer is made back to comparator #1, the latter half of its waveform L is the portion which is supplied through as an output to the meter indicator 30. By utilizing only the latter (and thus stabilized) halves of the respective differentiated error waveforms L and M to form the composite signal output Q of the comparator, any adverse effects on the meter reading 30 due to transient changes in the respective differentiator circuits 21 and 21' are eliminated.

It will of course be apparent to those skilled in the art that, in lieu of manual adjustment of the standard frequency source to obtain the desired frequency match, conventional feedback control means responsive to the amplitude and polarity of the comparator output signal could readily be provided, if desired, in either or both of the two disclosed circuit embodiments in order to automatically adjust the frequency output of the standard source to match that of the unknown frequency signal.

Figure 5B:
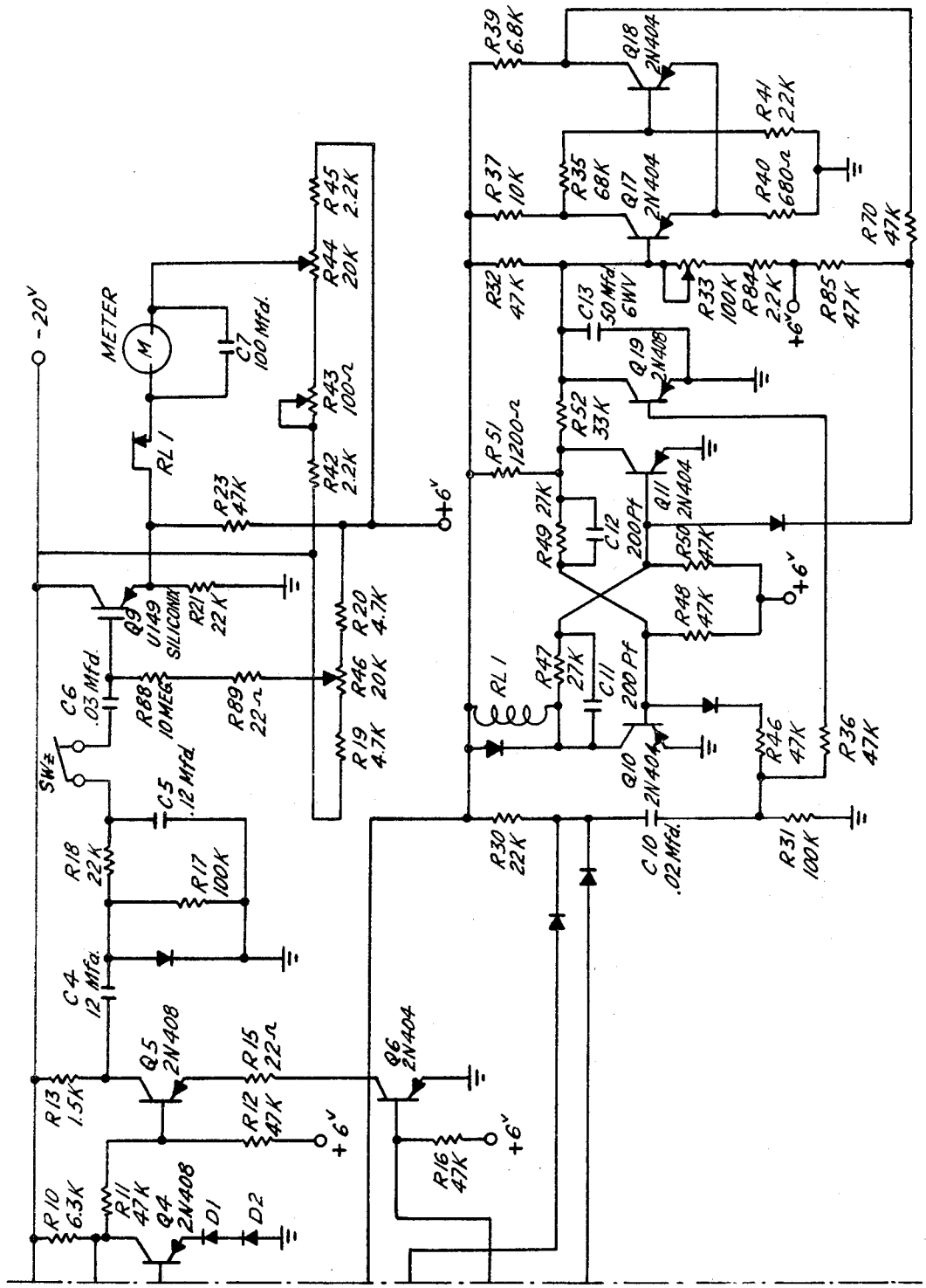
FIG. 5 (comprising FIGS. 5a and 5b arranged in lateral alignment) is an electrical schematic diagram of a suitable electrical circuit, with component parameter values indicated, for a single comparator frequency measuring system according to the embodiment of FIG. 1.
Figure 6A:
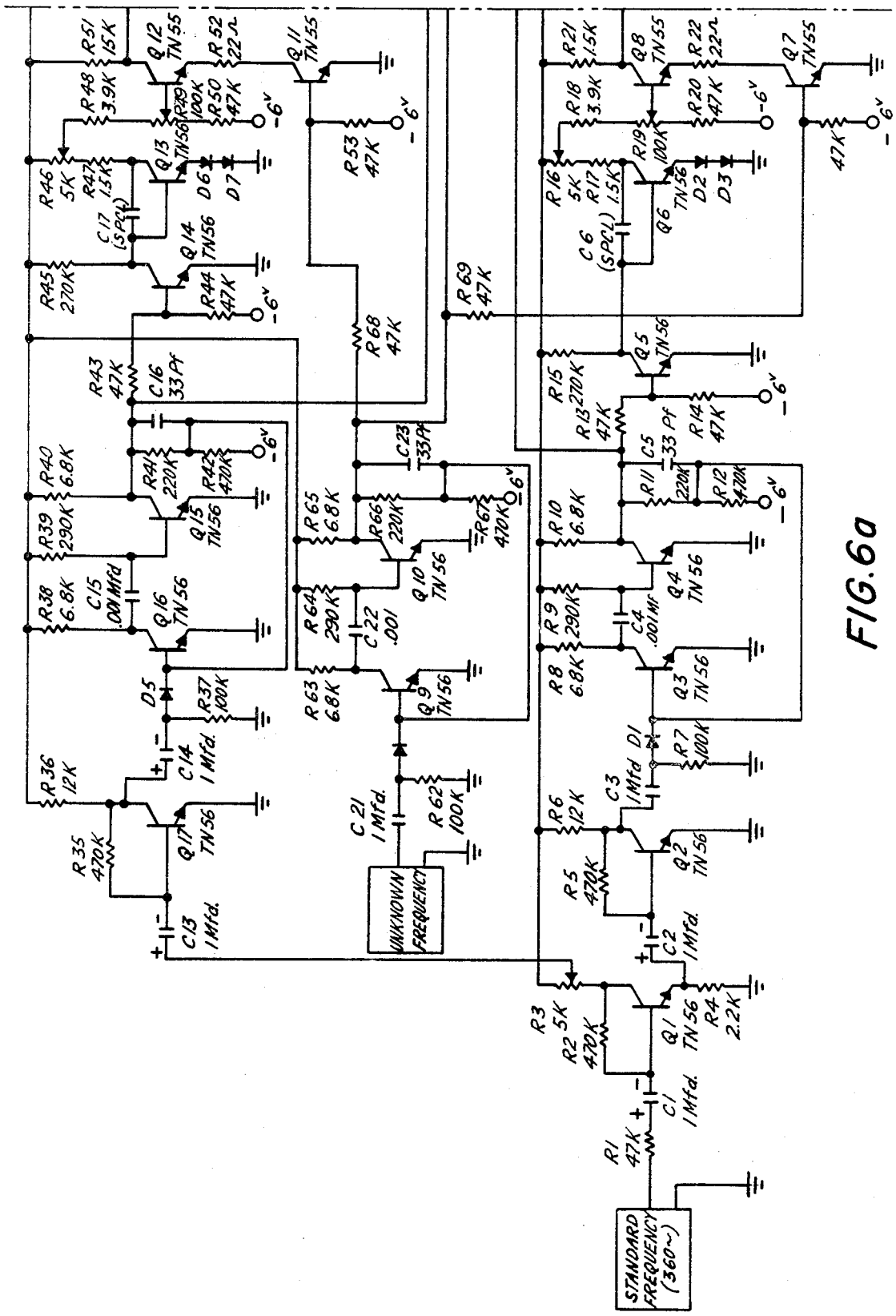
FIG. 6 (comprising FIGS. 6a and 6b arranged in lateral alignment) is an electrical schematic diagram of a suitable circuit, with component parameter values indicated, for a double comparator frequency measuring system according to the embodiment of FIG. 3.
Figure 6B:
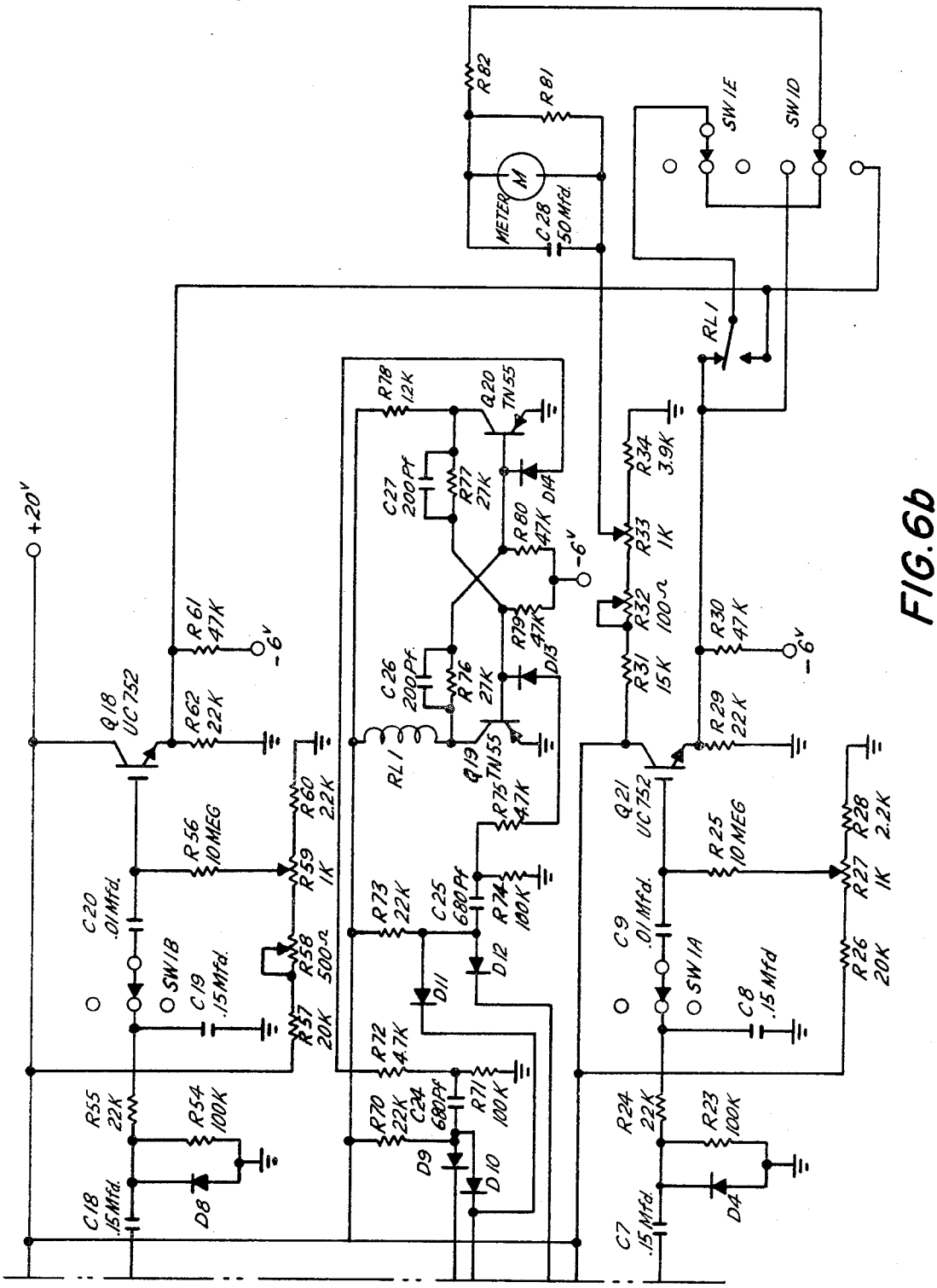

FIG. 5 is an electrical schematic diagram of an exemplary circuit construction of the single comparator system shown in FIG. 1. The types and values of all components of the circuit are indicated in the diagram in accordance with conventional electrical terminology practice. Similarly, FIG. 6 is an electrical schematic diagram of an exemplary circuit for a double comparator system according to the embodiment of FIG. 3.

What is claimed is:

1. Apparatus for detecting the difference in frequency between a first electrical signal and a second electrical signal, which comprises
   (a) a source of a first electrical signal having a known frequency,
   (b) a source of a second electrical signal having an unknown frequency,
   (c) first and second pulse generating means respectively supplied with said first and second electrical signals for generating a pulse of uniform amplitude and uniform duration for each cycle of each of said first and second signals to form corresponding first and second pulse trains each having a frequency equal to the frequency of its corresponding electrical signal,
   (d) sawtooth wave generating means supplied with said first pulse train for generating a uniform slope sawtooth wave for each pulse in said first pulse train to form a succession of sawtooth waves having the same frequency as said first pulse train,
   (e) gating means under the control of said second pulse train for sampling the amplitude of said succession of sawtooth waves in response to each pulse in said second pulse train to form a sequence of sawtooth wave samples which are uniform in duration but which have amplitudes that correspond to the amplitudes of the sampled sawtooth waves that coincide with the pulses in said second pulse train,
   (f) means for deriving from said sequence of sawtooth wave samples a succession of ramp function signals in which the slope of each of said ramp function signals is proportional to the difference in frequency between said first and second signals and in which the slope of each of said ramp function signals decreases from a maximum value at the beginning of each ramp function signal to a minimum value at the end of each ramp function signal, so that the minimum value at the end of each ramp function signal is immediately followed by the maximum value at the beginning of the next succeeding ramp function signal,
   (g) means supplied with said succession of ramp function signals for deriving from the slopes of said ramp function signals a unidirectional signal having a substantially constant amplitude proportionate to the difference in frequency between said first and second signals and a substantially constant polarity representative of that one of said first and second signals having the larger frequency, wherein said unidirectional signal is characterized by variations in amplitude and polarity at each point corresponding to said change from a minimum value at the end of each ramp function signal to a maximum value at the beginning of the next succeeding ramp function signal,
   (h) phase coincidence detecting means supplied with said first and second pulse trains for generating a control pulse for each coincidence in time between pulses in said first and second pulse trains, and
   (i) switching means responsive to said control pulse for eliminating from said unidirectional signal each of said variations in amplitude and polarity.

2. In combination with the apparatus defined in claim 1, at least one indicator means connected to said switching means for converting said unidirectional signal into a selected representation of the difference in frequency between said first and second signals.

3. A frequency discriminator for determining the difference in frequency between a first electrical signal having a known frequency and a second electrical signal having an unknown frequency, which comprises
   (a) a source of a first electrical signal having a known frequency,
   (b) a source of a second electrical signal having an unknown frequency,
   (c) means for generating from said second electrical signal a train of sampling pulses of uniform amplitude and uniform duration in which each pulse corresponds to a single cycle in said second electrical signal,
   (d) first comparator means supplied with said first electrical signal and said train of sampling pulses including
      (1) means for generating from said first signal a first train of reference pulses of uniform duration and uniform amplitude in which each reference pulse corresponds to a single cycle in said first electrical signal,
      (2) means supplied with said first train of reference pulses for generating for each reference pulse a sawtooth wave having a uniform slope to form a first succession of sawtooth waves,
      (3) first gating means responsive to said sampling pulses for sampling the amplitudes of said first succession of sawtooth waves in response to each pulse in said sampling pulse train to obtain a first sequence of sawtooth wave samples which are uniform in duration but which have amplitudes that correspond to the amplitudes of those portions of said first sequence of sampled sawtooth waves that coincide with said sampling pulses,
      (4) means for converting said first sequence of sawtooth wave samples into a first succession of ramp function signals each having a slope which is proportional to the difference in frequency between said first and second electrical signals and which decreases from a maximum value at the beginning of each of said first ramp function signals to a minimum value at the end of each of said first ramp function signals so that the minimum value at the end of each ramp function signal is immediately followed by the maximum value at the beginning of the next succeeding ramp function signal, (5) means for differentiating said first sequence of ramp function signals to obtain a first unidirectional signal with a substantially constant amplitude proportional to the difference in frequency between said first and second electrical signals and a substantially constant polarity representative of that one of said first and second electrical signals which has the higher frequency, wherein said first unidirectional signal is characterized by variations in amplitude and polarity at each point which corresponds to said change from a minimum value at the end of each ramp function signal to a maximum value at the beginning of the next succeeding ramp function signal, and (6) first means for detecting coincidences in phase between pulses in said first train of reference pulses and pulses in said train of sampling pulses to develop a first sequence of coincidence control pulses, (e) means for shifting the phase of said first electrical signal by 180° to obtain a 180° phase shifted signal, (f) second comparator means supplied with said 180° phase shifted signal and said train of sampling pulses including (1) means for generating from said 180° phase shifted signal a second train of reference pulses of uniform duration and uniform amplitude in which each reference pulse corresponds to a single cycle in said 180° phase shifted signal, (2) means supplied with said second train of reference pulses for generating for each reference pulse a sawtooth wave having a uniform slope to form a second succession of sawtooth waves having the same frequency as said first succession of sawtooth waves but differing in phase from said first succession of sawtooth waves by 180°, (3) second gating means responsive to said sampling pulses for sampling the amplitudes of said second succession of sawtooth waves in response to each pulse in said sampling pulse train to obtain a second sequence of sawtooth wave samlpes which are uniform in duration but have amplitudes that correspond to the amplitudes of those portions of said second sequence of sampled sawtooth waves that coincide with said sampling pulses, (4) means for converting said second sequence of sawtooth wave samples into a second succession of ramp function signals each having a slope which is proportional to the difference in frequency between said first and second electrical signals and which decreases from a maximum value at the beginning of each of said second ramp function signals so that the minimum value at the end of each ramp function signal is immediately followed by the maximum value at the beginning of the next succeeding ramp function signal, (5) means for differentiating said second sequence of ramp function signals to obtain a second unidirectional signal with a substantially constant amplitude proporitonal to the difference in frequency between said first and second electrical signals and a substantially constant polarity representative of that one of said first and second electrical signals which has the higher frequency, wherein said second unidirectional signal is characterized by variations in amplitude and polarity at each point which corresponds to said change from a minimum value at the end of each ramp function signal to a maximum value at the beginning of the next succeeding ramp function signal, and (6) second means for detecting coincidences in phase between pulses in said second train of reference pulses and said train of sampling pulses to develop a second sequence of coincidence control pulses, (g) means under the control of said first and second sequences of coincidence control pulses for selecting said first unidirectional signal to represent said difference in frequency between said first and second electrical signals in response to a pulse in said second sequence of coincidence control pulses, and said second unidirectional signal to represent said difference in frequency between said first and second electrical signals in response to a pulse in said first sequence of coincidence control pulses.

4. Apparatus as defined in claim 3 wherein said means for selecting comprises (a) switching means provided with first and second input terminals, a control terminal and an output terminal, (b) means for respectively applying said first and second unidirectional signals to said first and second input terminals of said switching means, (c) driving means provided with first and second input terminals and an output terminal, (d) means for connecting said output terminal of said driving means to said control terminal of said switching means, and (e) means for respectively applying said first and second sequences of coincidence control pulses to said first and second input terminals of said driving means, said driving means operates said switching means to pass said first unidirectional signal to the output terminal of said switching means in response to a pulse in said second sequence of coincidence control pulses, and to pass said second unidirectional signal to the output terminal of said switching means in response to a pulse in said first sequence of coincidence control pulses.

5. The method of detecting the difference in frequency between a first reference frequency electrical signal and a second unknown frequency electrical signal, which consists of the steps of (a) generating from each of said first and second signals a corresponding first and second train of pulses of uniform amplitude and uniform duration in which each pulse in each pulse train corresponds to one cycle of the corresponding signal, (b) generating from each pulse in said first pulse train a sawtooth wave of uniform slope to form a succession of sawtooth waves having the reference frequency of said first signal, (c) sampling said succession of sawtooth waves under the control of said second pulse train to obtain a third train of pulses in which each of said pulses is of uniform duration but in which each of said pulses has an amplitude that corresponds to the amplitude of that portion of the sampled sawtooth wave that coincides with the corresponding pulse in said second pulse train, (d) rectifying said third pulse train to form a sequence of ramp function signals each having a slope which is proportionate to the difference in frequency between said first and second signals and which decreases from a maximum value at the beginning of each ramp function to a minimum value at the end of each ramp function signal so that the minimum value at the end of each ramp function signal is immediately followed by the maximum value at the beginning of the next following ramp function signal, (e) differentiating said sequence of ramp function signals to obtain a derivative signal with a substantially constant amplitude proportional to the difference in frequency between said first and second signals and a substantially constant polarity representative of that one of said first and second signals which has the higher frequency, wherein said derivative signal is characterized by variations in amplitude and polarity at points which correspond to each of said changes from a minimul value at the end of each ramp function signal to a maximum value at the beginning of the next succeeding ramp function signal, (f) detecting coincidences in phase between pulses in said first pulse train and pulses in said second pulse train to form a switching function signal indicative of each of said phase coincidences, and (g) eliminating from said derivative signal each of said variations in amplitude and polarity by suppressing said derivative signal at each phase coincidence indicated by said switching function signal.

6. The method of detecting the difference in frequency between a first electrical signal having a known frequency and a second electrical signal having an unknown frequency, which consists of the steps of (a) generating from said first electrical signal a pair of first and second sequences of sawtooth waves each having the same frequency as said first electrical signal, said first sequence of sawtooth wave having the same phase as said first electrical signal and said second sequence of sawtooth waves having a phase displaced by 180° from the phase of said first electrical signal, including (1) generating from said first electrical signal a first train of pulses of uniform amplitude and uniform duration in which each pulse corresponds to one cycle of said first electrical signal, (2) shifting the phase of said first electrical signal by 180° to form a phase shifted signal, (3) generating from said phase shifted signal a second train of pulses of uniform amplitude and duration in which each pulse corresponds to one cycle of said phase shifted signals, and (4) generating from each pulse in each of said first and second pulse trains a corresponding sawtooth wave of uniform slope to form said pair of first and second sequences of sawtooth waves, (b) generating from said second electrical signal a third train of pulses of uniform amplitude and uniform duration in which each pulse corresponds to one cycle of said second electrical signal, (c) sampling each of said first and second sequences of sawtooth wave under the control of said third pulse train to obtain fourth and fifth trains of pulses in which the duration of said pulses is uniform but in which the amplitude of each of said pulses correspond to the amplitude of that portion of the sawtooth wave which coincides with the corresponding pulse in said third pulse train, (d) rectifying each of said forth and fifth pulse trains to form first and second sequences of ramp function signals in which each ramp function signal has a slope proportional to the difference in frequency between said first and second electrical signals and in which the slope of each ramp function signal decreases from a maximum value at the beginning of each ramp function signal to a minimum value at the end of each ramp function signal so that the minimum value at the end of each ramp function signal is immediately followed by the maximum value at the beginning of the next following ramp function signal, (e) differentiating each of said first and second sequences of ramp function signals to obtain first and second unidirectional signals each having a substantially constant amplitude proportional to the difference in frequency between said first and second electical signals and a substantially constant polarity representative of that one of said first and second electrical signals which has the lower frequency, wherein each of said unidirectional signals is characterized by variations in amplitude and polarity at points which correspond to each of said changes from a minimum value at the end of a ramp function signal to a maximum value at the beginning of the next succeding ramp function signal, (f) detecting coincidences in phase between pulses in said first pulse train and pulses in said third pulse train, and between pulses in said second pulse train and said third pulse train to form first and second sequences of switching pulses in which each switching pulse indicates the exact instant of each of said coincidences, and (g) selecting said first unidirectional signal to represent said difference in frequency between said first and second electrical signals in response to the presence of a switching pulse in said second sequence of switching pulses, and said second unidirectional signal to represent said difference in frequency in response to the presence of a switching pulse in said first sequence of switching pulses.

References Cited

UNITED STATES PATENTS 2,280,524  4/1942  Hansen.
3,235,800  2/1966  Turrell _____ 324—79

ALFRED E. SMITH, Primary Examiner

PO-1050
(5/69)

UNITED STATES PATENT OFFICE
CERTIFICATE OF CORRECTION

Patent No. 3,519,928     Dated July 7, 1970

Inventor(s) M. Braverman

It is certified that error appears in the above-identified patent and that said Letters Patent are hereby corrected as shown below:

| COLUMN NO. | LINE | CORRECTION |
|---|---|---|
| 2 | 41 | Change "signal" to --single-- |
| 2 | 43 | After "ing" insert --to-- |
| 3 | 2 | "F-M" should be --f-m-- |
| 3 | 21 | "arallel" should be --parallel-- |
| 8 | 23 | Change "subscript" to --superscript-- |
| 8 | 33 | Change "known" to --unknown-- |
| 8 | 55 | "possess" should be --possesses-- |
| 10 | 39 | "$O_F$" should be --$O_P$-- |
| 10 | 51 | "$N_F$" should be --$N_P$-- |
| 10 | 71 | "conection" should be --connection-- |
| 11 | 9 | "be tween" should be --between-- |
| 13 | 72 | "proporitonal" should be --proportional-- |
| 15 | 31 | "wave" should be --waves-- |
| 15 | 45 | "signals" should be --signal-- |
| 15 | 55 | "wave" should be --waves-- |
| 16 | 1 | After "of" insert --each of-- |
| 16 | 2 | "correspond" should be --corresponds-- |
| 16 | 24 | "electical" should be --electrical-- |

SIGNED AND
SEALED
OCT 13 1970

(SEAL)
Attest:

Edward M. Fletcher, Jr.
Attesting Officer

WILLIAM E. SCHUYLER, JR
Commissioner of Patents